(12) United States Patent
Ratn et al.

(10) Patent No.: US 9,323,542 B2
(45) Date of Patent: Apr. 26, 2016

(54) OPTIMIZED COLD BOOT FOR NON-VOLATILE MEMORY

(75) Inventors: Prasun Ratn, Hillsboro, OR (US);
Robert J. Royer, Jr., Portland, OR (US);
Suhas Nayak, Portland, OR (US);
Sanjeev N. Trika, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 267 days.

(21) Appl. No.: 13/977,081

(22) PCT Filed: Dec. 27, 2011

(86) PCT No.: PCT/US2011/067403
§ 371 (c)(1),
(2), (4) Date: Jun. 28, 2013

(87) PCT Pub. No.: WO2013/100908
PCT Pub. Date: Jul. 4, 2013

(65) Prior Publication Data
US 2014/0115315 A1    Apr. 24, 2014

(51) Int. Cl.
*G06F 9/44* (2006.01)
*G06F 3/06* (2006.01)
*G06F 12/10* (2016.01)

(52) U.S. Cl.
CPC ............ *G06F 9/4403* (2013.01); *G06F 9/4401* (2013.01); *G06F 3/0601* (2013.01); *G06F 12/10* (2013.01); *Y02B 60/1225* (2013.01)

(58) Field of Classification Search
CPC .......... G06F 9/44; G06F 12/10; G06F 3/0601
See application file for complete search history.

(56) References Cited

U.S. PATENT DOCUMENTS

| 2002/0166053 | A1 | 11/2002 | Wilson |
| 2006/0064575 | A1 | 3/2006 | Jo |
| 2007/0038800 | A1 | 2/2007 | Lakhani et al. |
| 2008/0215870 | A1 | 9/2008 | Liew |
| 2009/0027957 | A1* | 1/2009 | Jang ............................ 365/185.2 |
| 2011/0231713 | A1* | 9/2011 | Takada et al. .................... 714/54 |

OTHER PUBLICATIONS

International Search Report and Written Opinion, Mailed Date: Sep. 12, 2012, Application No. PCT/US2011/067403, Filed Date: Dec. 27, 2011, pp. 10.

* cited by examiner

*Primary Examiner* — Jaweed A Abbaszadeh
*Assistant Examiner* — Austin Hicks
(74) *Attorney, Agent, or Firm* — Kacvinsky Daisak Bluni PLLC

(57) ABSTRACT

Various embodiments are directed to apparatuses and methods for faster solid state drive (SSD) boot-up. On boot-up, SSD control algorithms may load non-logical to physical (L2P) parts of a context and signal the system that the SSD is ready. The context may comprise various state data pertaining to the SSD. After signaling that the SSD may be ready to receive access requests, the SSD control algorithms may begin loading segments of the L2P table sequentially. Access to the L2P table may be blocked, however, when a requested segment has not yet been loaded. In such cases, the SSD control algorithms may then load the requested segment out of turn and then service the access request.

29 Claims, 8 Drawing Sheets

FIG. 2
200

| | | |
|---|---|---|
| Segment Number 1 "loaded" LBAs (1 – 10) | Segment Number 2 "loaded" LBAs (11 – 20) | Segment Number 3 "loaded" LBAs (21 – 30) |
| Segment Number 4 "loaded" LBAs (31 – 40) | Segment Number 5 "loaded" LBAs (41 – 50) | Segment Number 6 "loaded" LBAs (51 – 60) |
| Segment Number 7 "loading" LBAs (61 – 70) | Segment Number 8 "not loaded" LBAs (71 – 80) | Segment Number 9 "not loaded" LBAs (81 – 90) |
| Segment Number 10 "not loaded" LBAs (91 – 100) | Segment Number 11 "not loaded" LBAs (101 – 110) | Segment Number 12 "loaded" LBAs (111 – 120) |
| Segment Number 13 "not loaded" LBAs (121 – 130) | Segment Number 14 "not loaded" LBAs (131 – 140) | Segment Number 15 "not loaded" LBAs (141 – 150) |
| Segment Number 16 "not loaded" LBAs (151 – 160) | Segment Number 17 "not loaded" LBAs (161 – 170) | Segment Number 18 "not loaded" LBAs (171 – 180) |
| * * | * * | * * |
| Segment Number (n-2) "not loaded" LBAs ([10n-29] – [10n-20]) | Segment Number (n-1) "not loaded" LBAs ([10n-19] – [10n-10]) | Segment Number (n) "not loaded" LBAs ([10n-9] – [10n]) |

300

400

500

600

OPTIMIZED COLD BOOT FOR NON-VOLATILE MEMORY

BACKGROUND

Current solid state drives (SSDs) have a boot-up time on the order of seconds meaning the drive is ready to service input/output (IO) requests seconds after being powered on. The boot-up time for an SSD may be characterized by the sum of: (i) hardware power-up boot-up time; (ii) a ROM boot-up time; (iii) a boot loader boot-up time; and (iv) a firmware initialization time. The longest time of the above may be spent in the firmware initialization phase. Firmware initialization requires more time because it needs to read in a logical-to-physical (L2P) indirection table, which may typically be on the order of hundreds of megabytes. Apart from the L2P table, the firmware may also need to restore certain other data that describes the NAND and firmware states. This state data may be collectively referred to as the 'context'.

The firmware may save the context to non-volatile memory on a clean shutdown and may read the context back on power-up. The L2P table forms the overwhelming chunk of the context. The size of the rest of the context is on the order of hundreds of kilobytes which is significantly less than the hundreds of megabytes for the L2P table. Therefore, the L2P table load time dominantly comprises the power-on boot-up time for the SSD.

Current SSDs also consume tens of milliwatts of power (typically 100 mW) when idle since both the SSD controller and the dynamic random access memory (DRAM) inside the SSD must remain powered on to maintain the SSD state. Accordingly, there may be a need for improved techniques to solve these and other problems.

BRIEF DESCRIPTION OF THE DRAWINGS

FIG. 2 illustrates one embodiment of a logical-to-physical (L2P) segment table according to an embodiment.

DETAILED DESCRIPTION

Figure 1A:
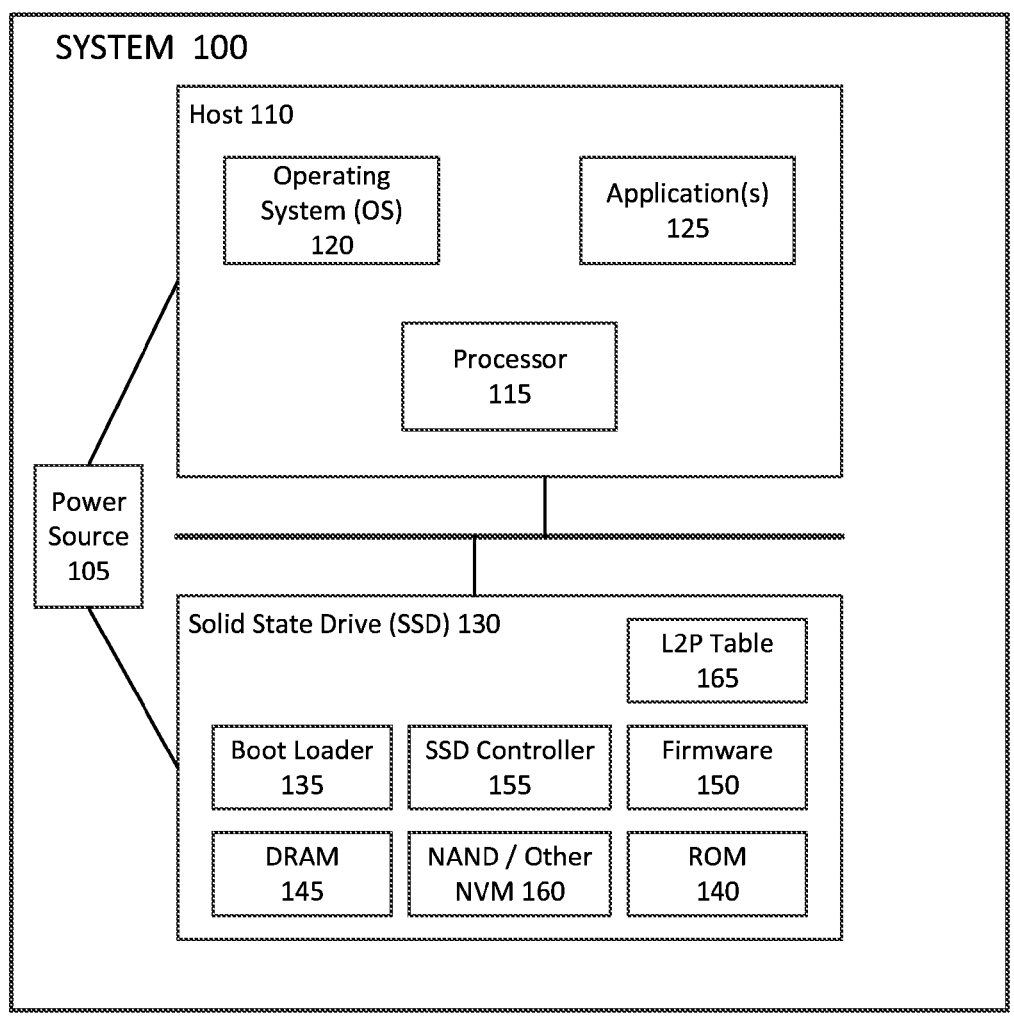
FIG. 1A illustrates a block diagram of a system in which a host may be in communication with a solid state drive (SSD) according to an embodiment.

Various embodiments are disclosed that significantly speed up the boot-up process for a non-volatile memory (NVM) device (e.g., an SSD) and reduce the idle power consumption of the NVM device to near zero. The NVM device may be powered down during system idle states and powered-up and may start servicing requests almost immediately. Because the boot-up time may be significantly reduced, it may not be a significant matter time-wise to power the NVM device down and up. This may be especially appealing for battery powered mobile devices that utilize NVM devices within.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1A illustrates a block diagram of a system 100 in which a host 110 may be in communication with a solid state drive (SSD) 130 according to an embodiment. The host 110 may be part of a larger system 100 and may comprise a processor 115, an operating system (OS) 120, and one or more applications 125. The applications 125 and operating system 120 may operate under control of the processor 115. The system 100 may also include a solid state drive (SSD) 130 under the control of an SSD controller 155. The SSD 130 may include a dynamic random access memory (DRAM) component 145, a boot loader 135, read-only memory (ROM) 140, firmware 150, a logical-to-physical (L2P) indirection table 165, and NAND (or other NVM) 160. A power source 105 may be used to provide power to the host 110 and its components as well as the SSD 130 and its components.

Pursuant to the embodiments described herein the SSD 130 may defer loading the L2P table 165 165 until after booting. In addition, the L2P table 165 165 may be paged out to NAND when idle time is detected, allowing the SSD 130 to be powered down during idle time.

The L2P table 165 may map a logical block address (LBA) to a physical address in memory that actually stores data within the SSD 130. In order to access (e.g., read or write) data into memory, the L2P table 165 (that maps the LBAs used in function calls to a physical memory address where the data is or will be stored) must be loaded.

As previously described, the boot-up time for an NVM device such as an SSD 130 may be characterized by the sum of a hardware power-up boot-up time, ROM boot-up time, boot loader boot-up time and firmware initialization time. The longest time may be spent in the firmware initialization phase. Firmware initialization requires more time because it needs to read in (e.g., load) the L2P table 165. Apart from the L2P table 165, the firmware may also need to restore certain other data that describes the NAND and firmware states of the NVM device. This state data may be collectively referred to as the context of the NVM devices (hereafter 'context'). The firmware 150 may save the context to non-volatile memory within the NVM device on a clean shutdown and may read the context back on power-up. The L2P table 165 forms the overwhelming chunk of the context. The size of the rest of the context is on the order of hundreds of kilobytes which is significantly less than the hundreds of megabytes for the L2P table 165. Therefore, the L2P table 165 load time comprises an overwhelming majority of power-on boot-up time for the SSD 130 or other NVM device.

Since the L2P table 165 may be stored in NAND page(s) 160 it may not need to be loaded all at once. The L2P table 165 may be divided into segments. A table segment may be a unit of data that may be loaded from NAND in one operation. For example, a segment size may be the size of one physical NAND page 160. The actual size of the segment may depend on the implementation.

On boot-up, SSD control algorithms may load the non-L2P parts of the context and signal the system 100 that the SSD 130 is ready. The SSD control algorithms may be executed by a processor circuit. The processor circuit executing the SSD control algorithms may be implemented in various ways. In one embodiment illustrated in FIG. 1A, the processor circuit executing the SSD control algorithms may be implemented within the firmware 150 on an embedded processor within the SSD 130. In another embodiment illustrated in FIG. 1B, the processor circuit executing the SSD control algorithms may be implemented within hardware (HW) state machines 170 within the SSD 130. In still another embodiment illustrated in FIG. 1C, the processor circuit executing the SSD control algorithms may be implemented by the host 110 as SSD algorithm code 175 under the control of the processor 115. Regardless of the implementation, the SSD control algorithms manage certain aspects of the SSD 130.

Referring to FIG. 1A, after loading the non-L2P parts of the context the firmware 150 may execute the SSD control algorithms to signal the host 110 that the SSD 130 is ready to accept access requests. The firmware 150 may then execute the SSD control algorithms to begin loading segments of the L2P table 165. A data structure termed the 'segment table' may track the state of the segments. The segment table may have one entry per segment that indicates the state of the segment. Segments states may comprise one of the following: not loaded; loading; or loaded.

Access requests to the L2P table 165 may be blocked when a segment containing an LBA within the access request has not yet been loaded into the L2P table 165. The firmware 150 may execute the SSD control algorithms to load the segments sequentially unless there is an L2P access request on a segment that has yet to be loaded. In that case, the relevant segment may be loaded out of turn (e.g., on-demand loading). The penalty for a blocked L2P table request is relatively small (e.g., 100 μsec). This increase in latency is likely not noticeable to a user for the relatively small number of access requests that may be loaded out of turn.

Figure 1B:
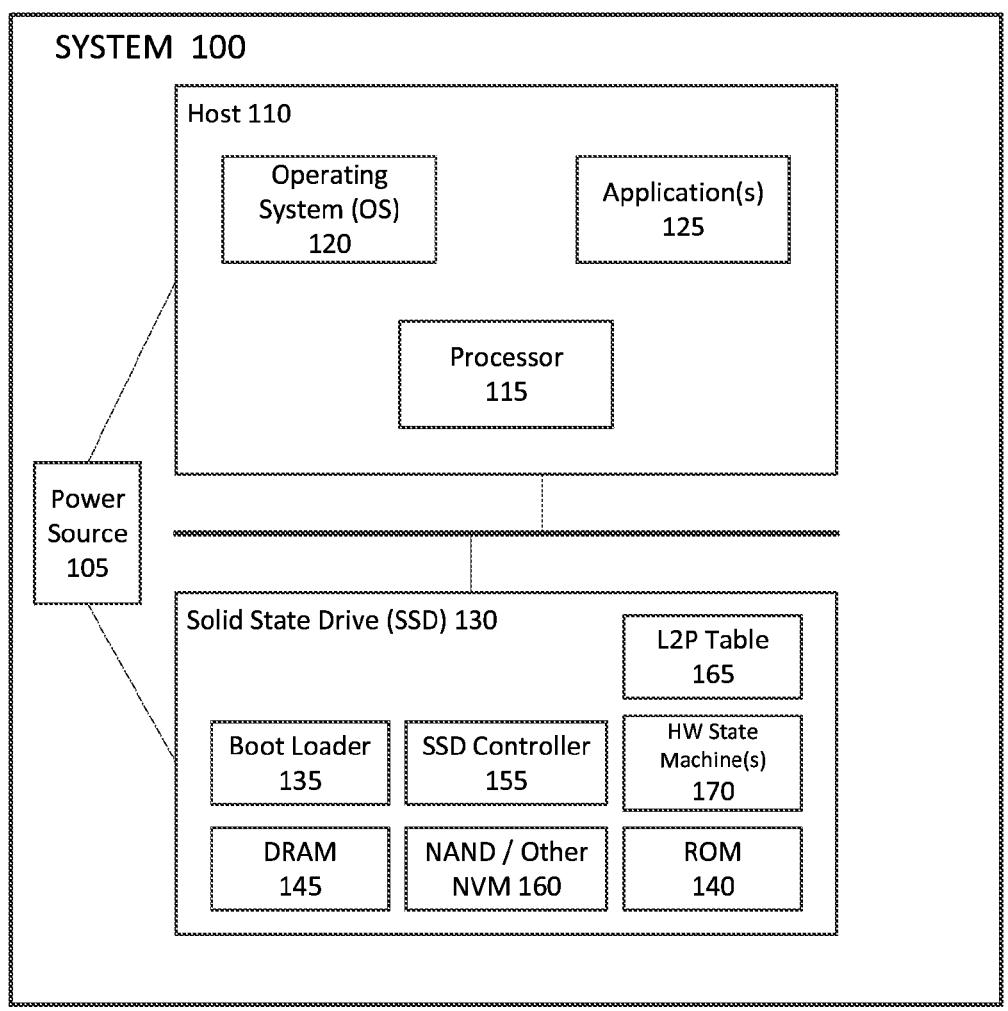
FIG. 1B illustrates a block diagram of a system in which a host may be in communication with a solid state drive (SSD) according to an embodiment.

Referring to FIG. 1B, after loading the non-L2P parts of the context the HW state machines 170 may execute the SSD control algorithms to signal the host 110 that the SSD 130 is ready to accept access requests. The HW state machines 170 may then execute the SSD control algorithms to begin loading segments of the L2P table 165. A data structure termed the 'segment table' may track the state of the segments. The segment table may have one entry per segment that indicates the state of the segment. Segments states may comprise one of the following: not loaded; loading; or loaded.

Access requests to the L2P table 165 may be blocked when a segment containing an LBA within the access request has not yet been loaded into the L2P table 165. The HW state machines 170 may execute the SSD control algorithms to load the segments sequentially unless there is an L2P access request on a segment that has yet to be loaded. In that case, the relevant segment may be loaded out of turn (e.g., on-demand loading).

Figure 1C:
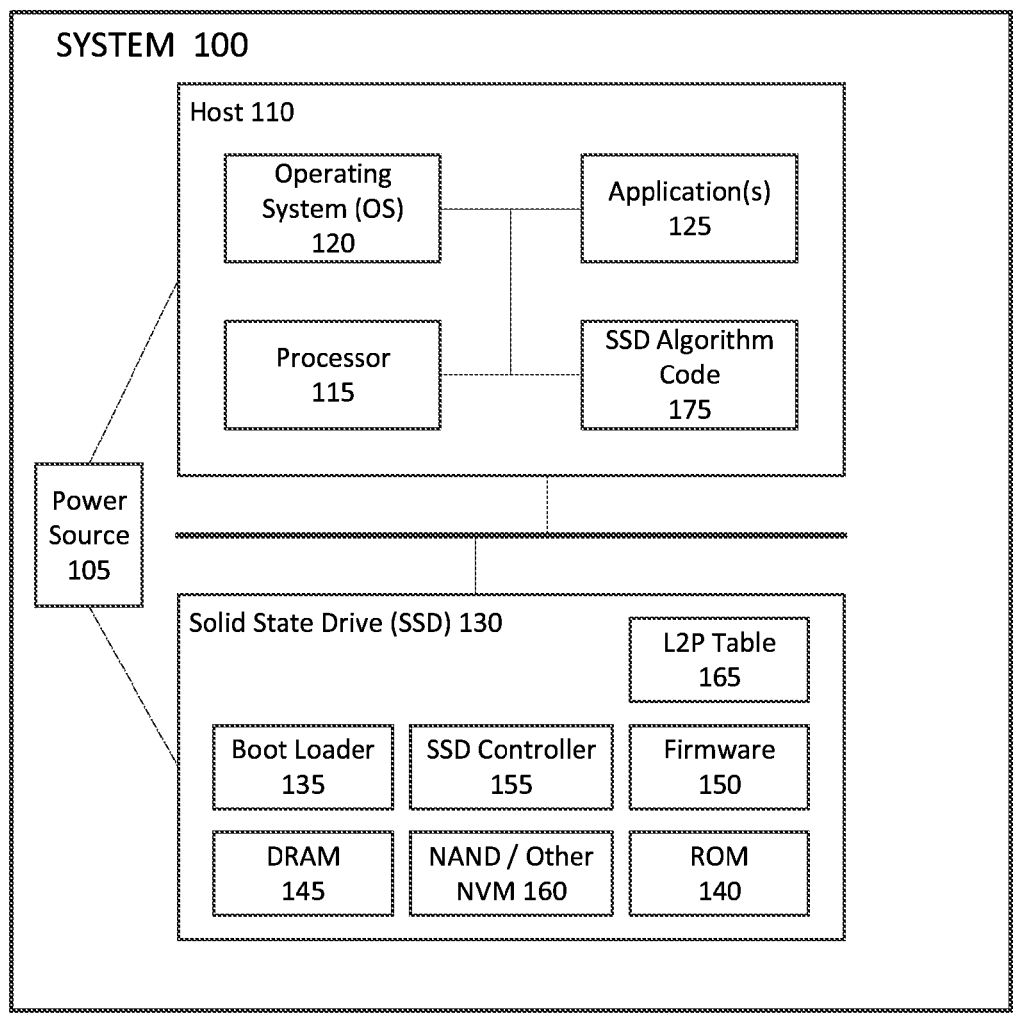
FIG. 1C illustrates a block diagram of a system in which a host may be in communication with a solid state drive (SSD) according to an embodiment.

Referring to FIG. 1C, after loading the non-L2P parts of the context the processor 115 may execute the SSD control algorithm code to have the SSD signal the host 110 that it is ready to accept access requests. The processor 115 may execute the SSD control algorithm code to begin loading segments of the L2P table 165. A data structure termed the 'segment table' may track the state of the segments. The segment table may have one entry per segment that indicates the state of the segment. Segments states may comprise one of the following: not loaded; loading; or loaded.

Access requests to the L2P table 165 may be blocked when a segment containing an LBA within the access request has not yet been loaded into the L2P table 165. The processor 115 may execute the SSD control algorithm code to load the segments sequentially unless there is an L2P access request on a segment that has yet to be loaded. In that case, the relevant segment may be loaded out of turn (e.g., on-demand loading).

Sequential loading may utilize the time when the SSD 130 may be idle making it more likely that segments may already be loaded when they are accessed. On-demand loading may reduce the latency that a request may endure if a requested segment has not yet been loaded. For many applications, I/O accesses have a high degree of locality meaning that consecutive accesses often hit the same segment. In this case, only the first access may need to suffer a segment miss penalty. Thus, on-demand loading ensures that latency is minimized and sequential loading ensures that only the early accesses (e.g., when the drive has just booted) may suffer from misses. During run-time, checking whether a segment is loaded incurs a minimal overhead.

The approach may be further optimized by prefetching multiple segments when a segment is accessed. Prefetching may accelerate sequential I/O. Furthermore, the segments that are typically accessed on a boot may be detected and may begin being fetched from a NAND page 160 even prior to the first I/O issued from the system 100.

For power-savings, the SSD 130 may enter into a zero power-state by first saving the context info to NAND on a trigger before powering down. The SSD 130 may then resume quickly as described above when powered back up. The trigger may come from the system 100 when the system 100 does not need the SSD 130 to stay powered. Alternatively, the trigger may be initiated by the SSD 130 itself when it detects idle time (e.g., a threshold amount of time passes since the last I/O). In some implementations of the latter case, the SSD 130 may need to signal the system 100 to request the system 100 to power down the SSD 130.

The embodiments described herein ensure that the SSD 130 is ready to service I/O requests much sooner after SSD 130 power-on without incurring high latencies when a segment of the L2P table 165 has not yet been loaded into non-volatile memory. The embodiments described herein also enable a zero power-state during SSD 130 idle times.

FIG. 2 illustrates one embodiment of a logical-to-physical (L2P) segment table 200 according to an embodiment. The L2P segment table 200 may be stored in NAND pages that may be divided into segments. A table segment may encompass multiple logical block addresses (LBAs). A table segment may be loaded from NAND in one operation. For example, a table segment size (e.g., number of LBAs) may be the size of one physical NAND page. The actual size of a table segment may depend on the implementation. The segment table 200 may track the state of the segments comprising the table 200. The segment table 200 may have one entry per segment that indicates the state of the segment. Segments states may comprise one of the following: not loaded; loading; or loaded.

According to the example L2P segment table 200, segment numbers 1-6 have already been loaded. Segment 7 may currently be loading. The remaining segments may have a status of "not loaded". The one exception may be segment 12 which is illustrated with a status of "loaded". Segment 12 may have been loaded out of sequence based on an 'on-demand' request.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
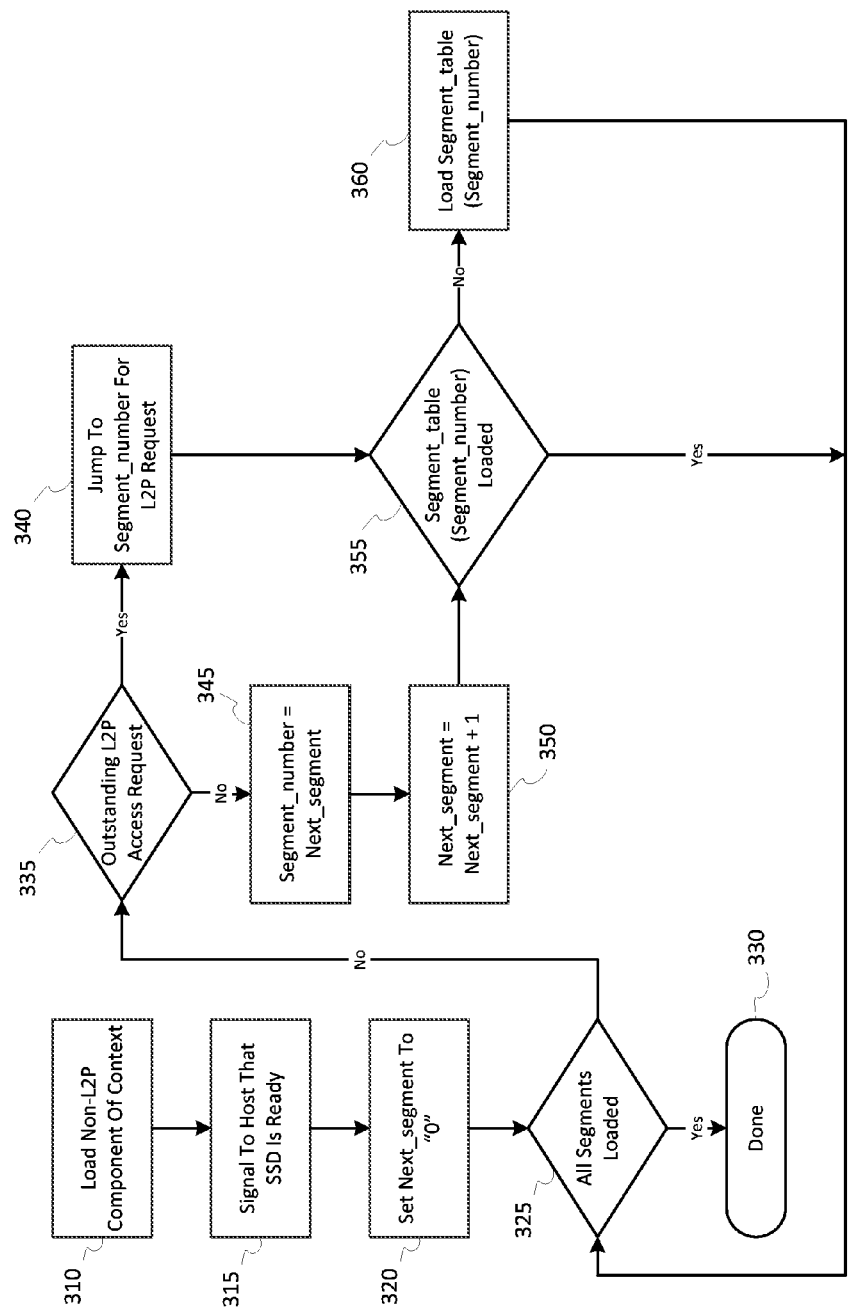
FIG. 3 illustrates one embodiment of a logic flow according to an embodiment.

FIG. 3 illustrates one embodiment of a logic flow 300. The logic flow 300 may be representative of some or all of the operations executed by one or more embodiments described herein that may implement loading the L2P table 165 in non-volatile memory such as an SSD 130. SSD control algorithms may carry out the loading and accessing of the L2P table 165. The SSD control algorithms may be implemented within firmware 150, HW state machine(s) 170, or the processor 115 executing SSD control algorithm code.

Non-L2P components of the context may be initially loaded. Since this part of the context is orders of magnitude smaller in size than the L2P table 165, this part of the boot-up process is relatively fast. Once the non-L2P components of the context have been loaded, the SSD 130 can signal the host that it is ready to begin loading the L2P table 165 on a segment by segment basis. The segment table may be initialized to load the first segment before entering a loop that will load and increment each subsequent segment. This may be referred to as sequential loading. Occasionally, an access request will reference a segment that has not yet loaded. In such a case, the requested segment may be loaded out of turn in an 'on-demand' fashion. Following an out of turn segment loading, the process may return to the point in the sequential loading prior to performing the 'on-demand' segment load.

In the illustrated embodiment shown in FIG. 3, the logic flow 300 may load the non-L2P components of the context at block 310. For example, on boot-up, SSD control algorithms may load the non-L2P parts of the context. The boot-up time for an SSD 130 may be characterized by the sum of a hardware power-up boot-up time, ROM boot-up time, boot loader boot-up time and firmware initialization time. The longest time may be spent in the firmware initialization phase. Firmware initialization requires more time because it needs to read in the L2P table 165. Apart from the L2P table 165, the firmware may also need to restore certain other data that describes the NAND and firmware states. This state data may be collectively referred to as the 'context'. The L2P table 165 forms the overwhelming chunk of the context. The size of the rest of the context is on the order of hundreds of kilobytes which is significantly less than the hundreds of megabytes for the L2P table 165. Prior to loading the L2P table 165, the SSD control algorithms may load the remaining components of the context. The embodiments are not limited in this context.

The logic flow 300 may signal the host 110 that the SSD 130 is ready at block 315. For example, the SSD control algorithms may determine that the SSD 130 is ready to receive and process access requests once the non-L2P components of the context have been loaded. While the L2P table 165 may not yet be fully loaded, the host 110 is nevertheless informed that the SSD 130 is ready to receive access requests. If an access request is received for a segment of the L2P table 165 that has not been loaded yet, the logic flow (as described below) may load the segment out of turn. The embodiments are not limited in this context.

The logic flow 300 may set a Next_segment parameter to "0" at block 320. For example, the L2P table 165 may be comprised of multiple segments that may be sequentially numbered from, for example, 1 to n. Initially, the status for each segment in the L2P table 165 will be "not loaded". The default loading method is sequential starting with segment number 1. Thus, a loading loop is initialized such that the first segment (e.g., Segment_number=1) will be loaded first. The embodiments are not limited in this context.

The logic flow 300 may determine whether all the segments for the L2P table 165 have been loaded at block 325. For example, the first step of the loop may be to determine whether all of the segments of the L2P table 165 have already been loaded. If it is determined that all of the segments of the L2P table 165 have already been loaded, the logic flow 300 naturally terminates at block 330. If it is determined that all of the segments of the L2P table 165 have not been loaded, the logic flow 300 advances to block 335. The embodiments are not limited in this context.

The logic flow 300 may next determine if there is an outstanding L2P access request at block 335. For example, SSD control algorithms may direct control of the logic flow 300 to the appropriate block based on whether there is or is not an access request pending to the L2P table 165. The logic flow 300 may be performing a sequential load when an access request to the L2P table 165 may be received. In such a case, the logic flow 300 may direct control to block 340 where an "on-demand" segment load may be performed. If there is no pending L2P access request, the sequential loading process continues and the segment number to be loaded is set to 'Next_segment' at block 345. After setting the segment number to the value "Next_segment" at block 345, "Next_segment" may be incremented by one at block 350 to ensure that the next iteration through the loop will load the next segment number. The embodiments are not limited in this context.

The logic flow 300 may jump to the segment number associated with an access request at block 340. For example, an access request to the L2P table 165 may have been received prior to the L2P table 165 being fully loaded. The access request may be a read request or a write request. The segment containing the logical block address(es) associated with the request may not have been loaded as yet. If the request were to wait until the L2P table 165 loaded the segment in sequence, an undesirable latency may be introduced into the system. Rather, than allow the latency to occur, the SSD controller 155 may jump the segment associated with the access request to the front of the queue. The embodiments are not limited in this context.

The logic flow 300 may determine whether a segment of the L2P table 165 has already been loaded at block 355. For example, block 350 may receive input from both a sequential segment loading control path (e.g., block 350) or an out of turn segment loading control path (e.g., block 340). Either way, the SSD controller 155 may determine if the currently queued segment to be loaded has already been loaded. If the currently queued segment has already been loaded into the L2P table 165, the SSD controller 155 may redirect control back to the top of the loop to block 325 where it is determined whether all the segments have been loaded. If the currently queued segment has not already been loaded into the L2P table 165, the SSD control algorithms may redirect control to block 360. The SSD control algorithms ensure that no segment in the L2P table 165 is loaded more than once. The embodiments are not limited in this context.

The logic flow 300 may load the currently queued segment for the L2P table 165 at block 360. For example, the SSD controller 155 may load the currently queued segment into the L2P table 165 upon determining that the segment has not yet been loaded. Once the SSD controller 155 finished loading the segment into the L2P table 165, it may redirect control back to the top of the loop to block 325 where it is determined whether all the segments have been loaded. The embodiments are not limited in this context.

Figure 4:
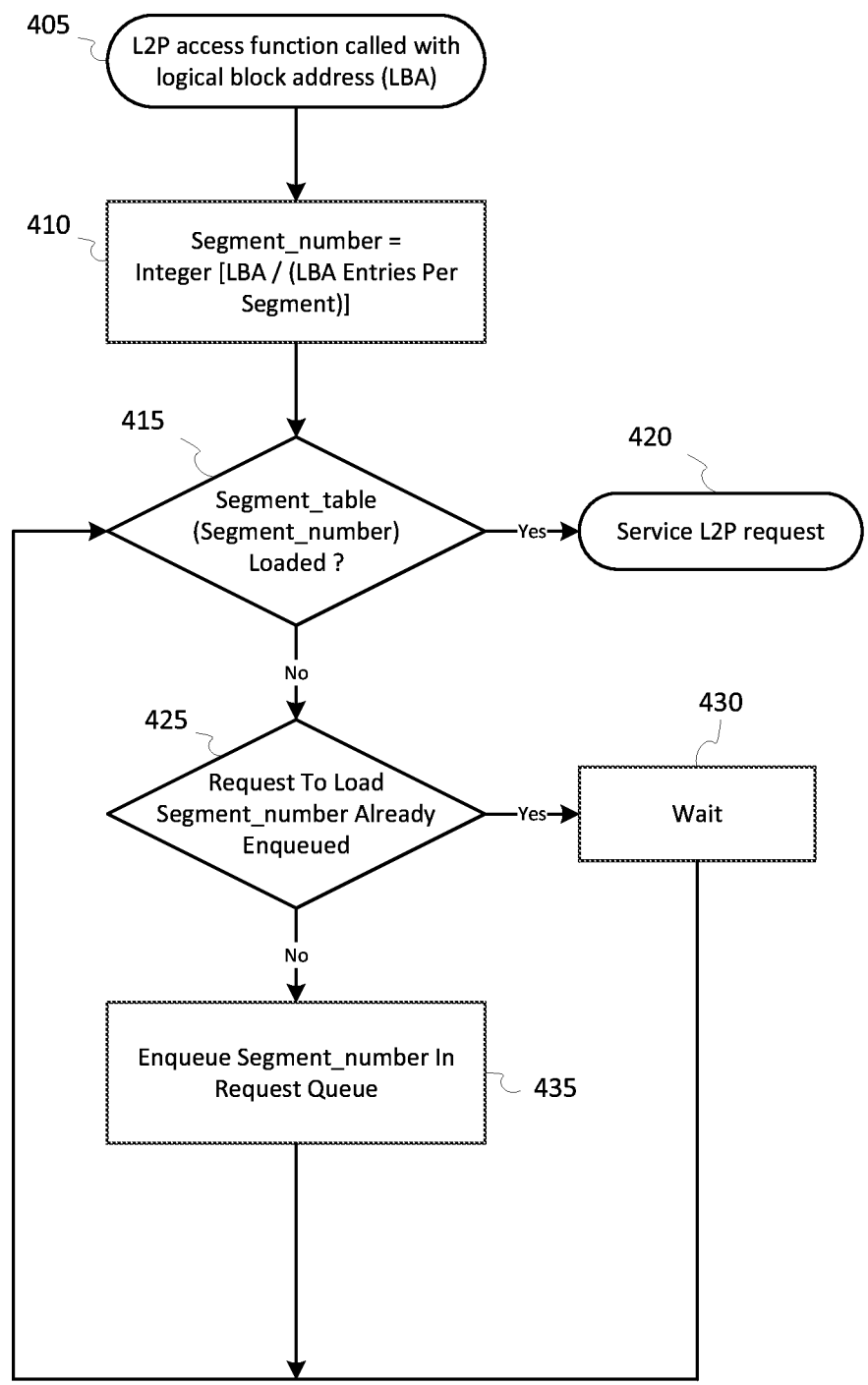
FIG. 4 illustrates one embodiment of a logic flow according to an embodiment.

FIG. 4 illustrates one embodiment of a logic flow 400. The logic flow 400 may be representative of some or all of the operations executed by one or more embodiments described herein that may access the L2P table 165 even if it has not yet been fully loaded. The L2P table 165 may receive access requests despite the fact that it may not be fully loaded at the time of the request. In such cases, the SSD controller may determine which segment within the L2P table 165 may be associated with the access request. The SSD controller may then determine if that segment has been loaded into the L2P table 165. If it has, the access request may be serviced normally. If the segment has not yet been loaded, the SSD controller 155 determines if a request to load the specific segment is pending. If not, the SSD controller 155 enqueues such a request to load the segment out of turn.

In the illustrated embodiment shown in FIG. 4, the logic flow 400 may receive an access request from a function at block 405. For example, the processor 115 on behalf of an application, the operating system 150 (or other system 100 component) may make a function call to access the L2P table 165. The function call may include a specific logical block address (LBA) within the L2P table 165. The embodiments are not limited in this context.

The logic flow 400 may determine the segment number associated with the logical block address (LBA) contained in the function call at block 410. For example, the SSD controller 155 may receive the function call having an associated logical block address (LBA). The SSD controller 155 may determine which segment includes the desired logical block address (LBA). Determining which segment includes the desired logical block address (LBA) may be a matter of dividing the requested LBA (LBAs may be sequentially numbered from 1 to n) by the number of LBAs per segment. Recall that each segment may represent a defined number of LBAs. The truncated results of this division may yield the segment number associated with the LBA of the access request received at block 405. The embodiments are not limited in this context.

The logic flow 400 may determine whether the segment determined at block 410 has been loaded at block 415. For example, the SSD controller 155 may determine whether the segment number determined at block 410 has been loaded into the L2P table 165. If the segment number has already been loaded into the L2P table 165, the access request may be serviced normally at block 420. If the segment number has not already been loaded into the L2P table 165, the access request may be forwarded to decision block 425. The embodiments are not limited in this context.

The logic flow 400 may determine whether a request to load the segment number determined at block 410 has been put into a request queue at block 425. For example, the SSD controller 155 may determine whether a request to load the segment number determined at block 410 has been put into a request queue. If a request to load the segment number has already been made and is in process, the logic flow 400 will wait a specified period of time at block 430 before returning control to block 415 to verify the segment has been loaded. If a request to load the segment number has not already been made, the logic flow 400 will send control to block 435. The embodiments are not limited in this context.

The logic flow 400 may create and queue a request to load a segment number at block 435. For example, the SSD controller may create and queue a request to load the segment number determined at block 410. This request may be received at block 335 of FIG. 3. FIG. 3 may be responsible for loading the L2P table 165 as described above. Block 335 may receive L2P access requests for segments that have not yet been loaded but may be able to load the segment out of turn to prevent latency issues from delaying I/O access requests. Once a request to load the segment has been forwarded to the logic associated with FIG. 3, the SSD controller 155 may return control to the decision block 415 where it is determined if the requested segment has been loaded yet. The embodiments are not limited in this context.

The processes just described with respect to FIGS. 3-4, permit sequential and out of turn loading of the L2P table 165 associated with a SSD 130. The L2P table 165 may be broken down into segments in which each segment may include a range of logical block addresses. Each table segment may be sized to correspond with the amount of data that can be accommodated by a NAND page 160 for a particular implementation. Table segments are then loaded sequentially by default. However, the SSD control algorithms may inform the host 110 that the SSD 130 is ready to be accessed even if the L2P table 165 has not yet been fully loaded. Thus, by signaling to the host that the SSD 130 is ready prior to full boot, the boot time may be dramatically reduced. On the occasions when an L2P access request is made for a part of the L2P table 165 that has not been loaded, the segment containing the requested logical block address (LBA) is loaded out of turn to prevent excessive latency issues. The overall result is to allow access to the L2P table 165 much sooner than waiting for a full boot. Even in cases when access is sought for unloaded parts of the L2P table 165, latency may be reduced by loading the requested segment out of turn.

An out of turn segment may be loaded based on an access request for a segment in the L2P table 165 that has not yet been loaded to reduce latency. Latency may be further reduced by loading multiple consecutive segments out of turn. For example, a request for segment not yet loaded may be received causing the requested segment to be loaded out of turn. For many applications, however, I/O accesses have a high degree of locality meaning that consecutive accesses often hit the same segment or nearby segments. In such cases, it may be prudent to load multiple consecutive segments when loading a requested segment out of turn.

Because the boot-up time for the SSD 130 can be significantly reduced, it becomes possible to power the SSD 130 down during system idle times without experiencing significant latency issues. Powering the SSD 130 down during idle times may result in significant power savings for the overall system 100 which may be especially beneficial for systems 100 implemented within battery powered devices. When the SSD 130 is powered down, the context information for the SSD 130 may be saved to NAND. Upon being powered back up, the non L2P context information and the L2P table 165 may be loaded as described in the embodiments above.

Various embodiments disclose an apparatus, system, and method for implementing a boot-up process for an SSD 130. The system may include a processor 115 communicatively coupled with additional system components and operative to execute software programs. The SSD 130 may include an L2P table 165 comprising an address mapping schema for translating logical block addresses (LBAs) to physical addresses in the SSD 130. The L2P table 165 may be partitioned into multiple table segments in which each of the multiple segments may include a sequential grouping of LBAs. The SSD control algorithms communicatively coupled with the processor 115 may be operative to cycle power to the SSD 130. A partial boot-up for the SSD 130 may be performed.

The partial boot-up does not include loading of the L2P table 165. Once the partial boot-up is complete, the host 110 may be signaled that the SSD 130 is ready to process access requests. The access requests may be function calls handled by the processor 115 and forwarded to the SSD 130 by way of the SSD control algorithms and the SSD controller 155. The SSD control algorithms may cause the loading of the multiple segments into the L2P table 165 in a sequential manner. While loading the table segments, an access request specifying an LBA within an unloaded segment may be received at the SSD 130. The SSD 130 may handle the access request by loading the unloaded segment into the L2P table 165 out of turn before resuming the loading of the multiple segments into the L2P table 165 in the sequential manner.

In another embodiment, the SSD control algorithms may be operative to load multiple additional unloaded segments into the L2P table 165. The multiple additional unloaded segments may be consecutive to the unloaded segment.

The SSD control algorithms may also be operative to determine the segment associated with an LBA by taking the integer value after dividing the requested LBA by the number of LBAs per segment, where the LBAs are sequentially numbered from 1 to n. A determination as to whether a particular segment has already been loaded may be performed prior to loading the particular segment.

The SSD 130 may be able to receive an access request in which the access request includes an LBA. Upon determining the segment associated with the LBA, it can be verified whether the segment associated with the LBA in the access request has been loaded. If the segment has been loaded, the SSD 130 may then service the access request for a particular segment upon.

The SSD 130 may be powered down when not in use. For example, the SSD 130 may be powered down when the processor 115 determines an idle state for the SSD 130 or if the SSD 130 itself determines an idle state. The SSD 130 may be powered back up when the processor 115 or other system component determines the SSD 130 is needed.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Figure 5:
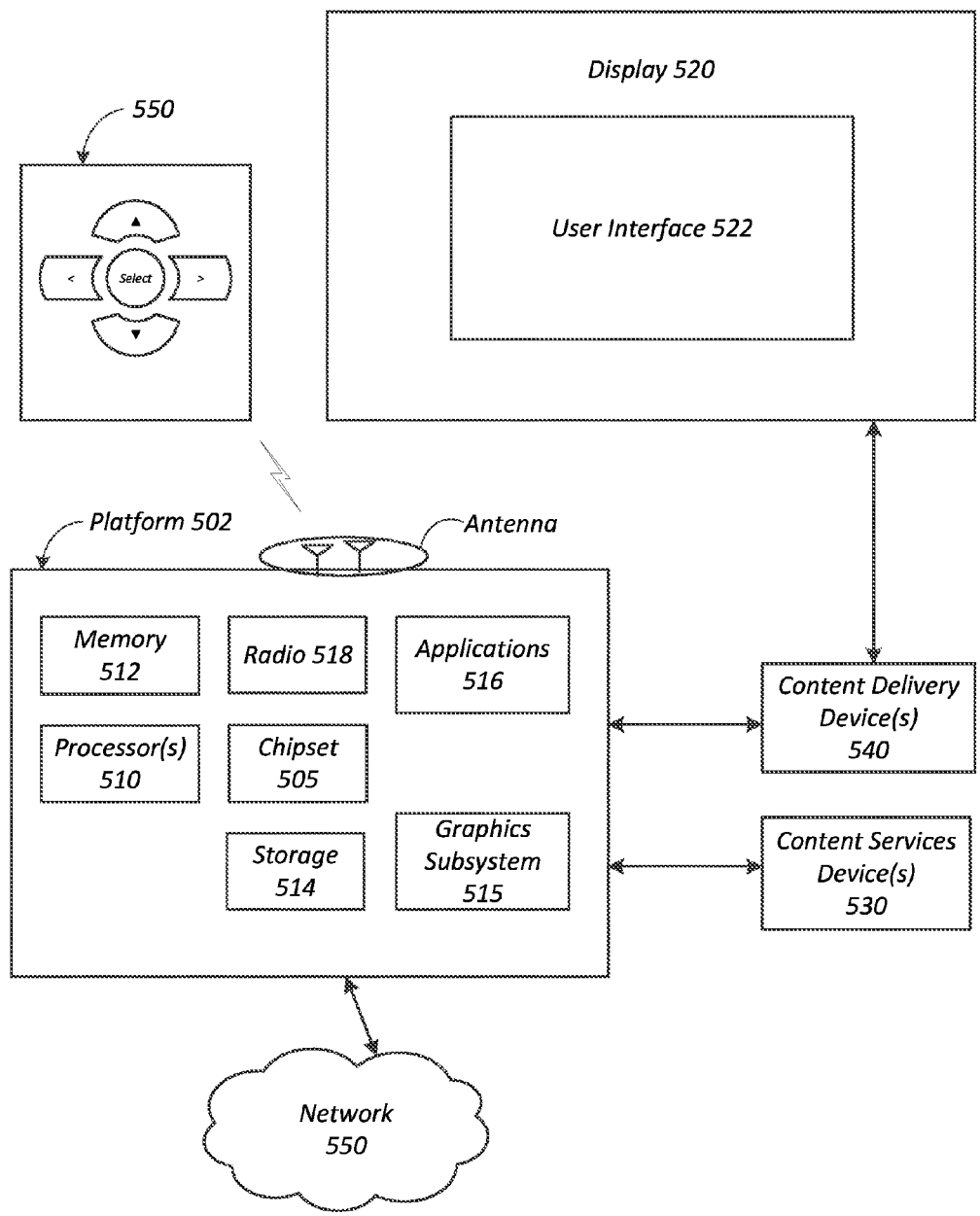
FIG. 5 illustrates an embodiment of a system that may be suitable for implementing embodiments of the disclosure.

FIG. 5 illustrates an embodiment of a system 500 that may be suitable for implementing the NVM boot loading embodiments of the disclosure. In embodiments, system 500 may be a system capable of implementing the NVM boot loading embodiments described above although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 500 comprises a platform 502 coupled to a display 520. Platform 502 may receive content from a content device such as content services device(s) 530 or content delivery device(s) 540 or other similar content sources. A navigation controller 550 comprising one or more navigation features may be used to interact with, for example, platform 502 and/or display 520. Each of these components is described in more detail below.

In embodiments, system 500 comprises a platform 502 coupled to a display 520. Platform 502 may receive content from a content device such as content services device(s) 530 or content delivery device(s) 540 or other similar content sources. A navigation controller 550 comprising one or more navigation features may be used to interact with, for example, platform 502 and/or display 520. Each of these components is described in more detail below.

In embodiments, platform 502 may comprise any combination of a chipset 505, processor(s) 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor(s) 510 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor(s) 510 may comprise dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 514 may comprise technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 could be integrated into processor 510 or chipset 505. Graphics subsystem 515 could be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 518 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, cellular data networks (e.g., 3G, LTE) and satellite networks. In communicating across such networks, radio 518 may operate in accordance with one or more applicable standards in any version.

In embodiments, display 520 may comprise any television type monitor or display. Display 520 may comprise, for example, a computer display screen, touch screen display, video monitor, television-like device, and/or a television. Display 520 may be digital and/or analog. In embodiments, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In embodiments, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In embodiments, content services device(s) 530 may comprise a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 receives content such as cable television programming including media information, digital information, and/or other content. Examples of content providers may include any cable or satellite television or radio or Internet content providers. The provided examples are not meant to limit embodiments of the invention.

In embodiments, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be echoed on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but integrated into platform 502 and/or display 520. Embodiments, however, are not limited to the elements or in the context shown or described herein.

In embodiments, drivers (not shown) may comprise technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 when the platform is turned "off." In addition, chip set 505 may comprise hardware and/or software support for 5.1 surround sound audio and/or high definition 5.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the invention.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
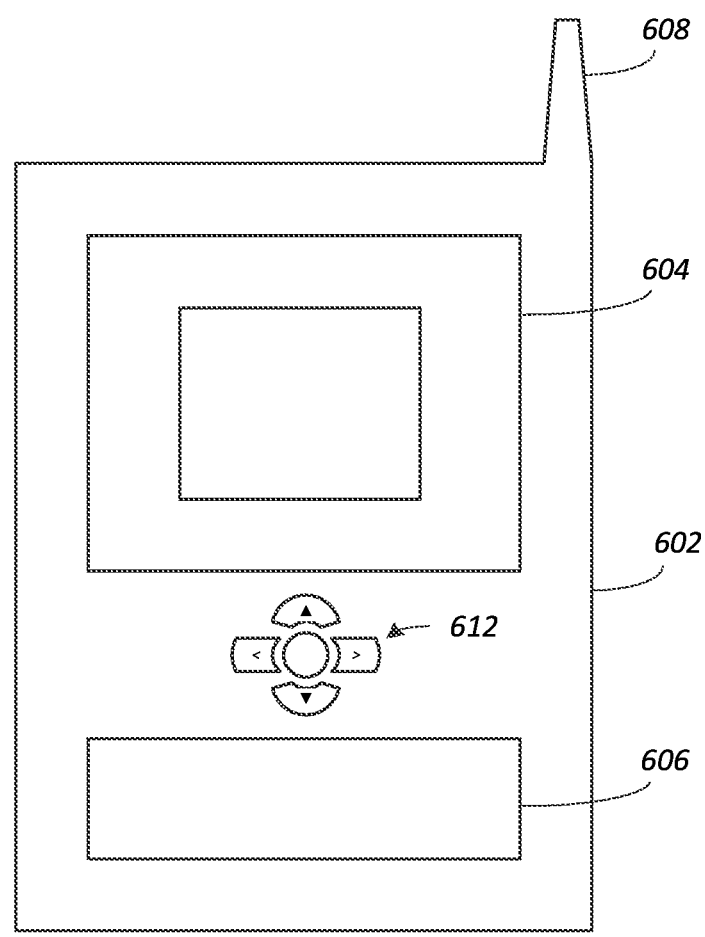
FIG. 6 illustrates embodiments of a small form factor device in which the system of FIG. 5 may be embodied.

As described above, system 500 may be embodied in varying physical styles or form factors. FIG. 6 illustrates embodiments of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may comprise a housing 602, a display 604, an input/output (I/O) device 606, and an antenna 608. Device 600 also may comprise navigation features 612. Display 604 may comprise any suitable display unit for displaying information appropriate for a mobile computing device. I/O device 606 may comprise any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a processor circuit executing solid state drive (SSD) control algorithms operative to:
cycle power to a solid state drive (SSD), the SSD including a logical-to-physical (L2P) table stored to a non-volatile memory at the SSD, the L2P table comprising an address mapping schema for translating logical block addresses (LBAs) to physical addresses in the SSD, the L2P table being partitioned into multiple table segments, each of the multiple table segments including a sequential grouping of LBAs;
perform a partial boot-up for the SSD, the partial boot-up not including loading of the L2P table to a volatile memory maintained at the SSD;
signal that the SSD is ready to process access requests upon completion of the partial boot-up;
load the multiple table segments of the L2P table in a sequential manner to the volatile memory; and
handle an access request specifying an LBA within an unloaded segment.

2. The apparatus of claim 1, the processor circuit operative to:
load the unloaded segment of the L2P table to the volatile memory; and
resume the loading of the multiple table segments of the L2P table in the sequential manner once the unloaded segment has been loaded to the volatile memory.

3. The apparatus of claim 2, the processor circuit operative to load multiple additional unloaded segments of the L2P table to the volatile memory, the multiple additional unloaded segments being consecutive to the unloaded segment.

4. The apparatus of claim 2, the processor circuit operative to determine the segment associated with an LBA by taking an integer value after dividing the requested LBA by a number of LBAs per segment, where the LBAs are sequentially numbered from 1 to n.

5. The apparatus of claim 2, comprising the processor circuit operative to:
determine whether a particular segment has been loaded to the volatile memory prior to loading the particular segment to the volatile memory;
receive an access request, the access request including an LBA;
verify the segment associated with the LBA in the access request has been loaded to the volatile memory; and
service the access request for a particular segment upon verification the segment has been loaded to the volatile memory.

6. The apparatus of claim 1, the processor circuit operative to power down the SSD when the processor circuit determines an idle state for the SSD.

7. The apparatus of claim 6, the processor circuit operative to power up the SSD when the processor circuit determines the SSD is needed.

8. The apparatus of claim 1, the SSD operative to signal the processor circuit to power the SSD down when the SSD determines it is in an idle state.

9. The apparatus of claim 1, the processor circuit implemented as firmware on an embedded processor within the SSD.

10. The apparatus of claim 1, the processor circuit implemented as hardware state machines within the SSD.

11. The apparatus of claim 1, wherein the processor circuit executes the SSD control algorithms.

12. A method, comprising:
powering on a solid state drive (SSD);
performing a partial boot-up for the SSD, the partial boot-up not including loading of a logical-to-physical (L2P) table for the SSD to a volatile memory at the SSD, the L2P table stored to a non-volatile memory at the SSD, the L2P table comprising an address mapping schema for translating logical block addresses (LBAs) to physical addresses in the SSD, the L2P table being partitioned into multiple table segments, each of the multiple table segments including a sequential grouping of LBAs;
signaling that the SSD is ready to process access requests upon completion of the partial boot-up;
loading the multiple table segments of the L2P table in a sequential manner to the volatile memory; and
interrupting the sequential loading of the multiple table segments of the L2P table to handle an access request specifying an LBA within an unloaded segment.

13. The method of claim 12 comprising:
loading the unloaded segment of the L2P table to the volatile memory; and
resuming the loading of the multiple table segments of the L2P table in the sequential manner once the unloaded segment has been loaded to the volatile memory.

14. The method of claim 13 comprising loading multiple additional unloaded segments of the L2P table to the volatile memory, the multiple additional unloaded segments being consecutive to the unloaded segment.

15. The method of claim 12 comprising determining the unloaded segment associated with an access request specifying an LBA by taking an integer value after dividing the requested LBA by a number of LBAs per segment, where the LBAs are sequentially numbered from 1 to n.

16. The method of claim 12 comprising:
determining whether a particular segment has been loaded to the volatile memory prior to loading the particular segment to the volatile memory;
receiving an access request, the access request including an LBA;
verifying the segment associated with the LBA in the access request has been loaded to the volatile memory; and
servicing the access request for a particular segment upon verification the segment has been loaded to the volatile memory.

17. A system, comprising:
a processor communicatively coupled with additional system components and operative to execute software programs;
a solid state drive (SSD), the SSD including a logical-to-physical (L2P) table stored to a non-volatile memory at the SSD, the L2P table comprising an address mapping schema for translating logical block addresses (LBAs) to physical addresses in the SSD, the L2P table being partitioned into multiple table segments, each of the multiple table segments including a sequential grouping of LBAs; and a processor circuit executing solid state drive (SSD) control algorithms operative to:
cycle power to the SSD;
perform a partial boot-up for the SSD, the partial boot-up not including loading of the L2P table to a volatile memory;
signal that the SSD is ready to process access requests upon completion of the partial boot-up;
load the multiple table segments of the L2P table in a sequential manner to the volatile memory; and
handle an access request specifying an LBA within an unloaded segment.

18. The system of claim 17, the processor circuit operative to:
load the unloaded segment of the L2P table to the volatile memory; and
resume the loading of the multiple table segments of the L2P table in the sequential manner once the unloaded segment has been loaded to the volatile memory.

19. The system of claim 18, the processor circuit operative to load multiple additional unloaded segments of the L2P table to the volatile memory, the multiple additional unloaded segments being consecutive to the unloaded segment.

20. The system of claim 18, the processor circuit operative to determine the segment associated with an LBA by taking an integer value after dividing the requested LBA by a number of LBAs per segment, where the LBAs are sequentially numbered from 1 to n.

21. The system of claim 18, comprising the processor circuit operative to:
determine whether a particular segment has been loaded to the volatile memory prior to loading the particular segment to the volatile memory;
receive an access request, the access request including an LBA;
verify the segment associated with the LBA in the access request has been loaded; and
service the access request for a particular segment upon verification the segment has been loaded to the volatile memory.

22. The system of claim 17, the SSD operative to signal the processor circuit to power the SSD down when the SSD determines it is in an idle state.

23. The system of claim 17, the processor circuit operative to power up the SSD when the processor determines the SSD is needed.

24. The system of claim 17, the processor circuit implemented as firmware on an embedded processor within the SSD.

25. The system of claim 17, the processor circuit implemented as hardware state machines within the SSD.

26. At least one non-transitory computer-readable storage medium comprising instructions that, when executed, cause a system to:
perform a partial boot-up for an SSD, the partial boot-up not including loading of a logical-to-physical (L2P) table for the SSD to a volatile memory at the SSD, the L2P table stored to a non-volatile memory at the SSD, the L2P table comprising an address mapping schema for translating logical block addresses (LBAs) to physical addresses in the SSD, the L2P table being partitioned into multiple table segments, each of the multiple table segments including a sequential grouping of LBAs;
signal that the SSD is ready to process access requests upon completion of the partial boot-up;
load the multiple table segments of the L2P table in a sequential manner to the volatile memory; and
load an unloaded segment of the L2P table to the volatile memory when an access request specifying an LBA within the unloaded segment is received.

27. The non-transitory computer-readable storage medium of claim 26, containing instructions that when executed cause a system to resume the loading of the multiple table segments of the L2P table in the sequential manner once the unloaded segment has been loaded to the volatile memory and load multiple additional unloaded segments of the L2P table to the volatile memory, the multiple additional unloaded segments being consecutive to the unloaded segment.

28. The non-transitory computer-readable storage medium of claim 26, containing instructions that when executed cause a system to determine the segment associated with an LBA by taking an integer value after dividing the requested LBA by a number of LBAs per segment, where the LBAs are sequentially numbered from 1 to n.

29. The non-transitory computer-readable storage medium of claim 26, containing instructions that when executed cause a system to:
determine whether a particular segment has been loaded to the volatile memory prior to loading the particular segment to the volatile memory;
receive an access request, the access request including an LBA;
verify the segment associated with the LBA in the access request has been loaded to the volatile memory; and
service the access request for a particular segment upon verification the segment has been loaded to the volatile memory.

* * * * *